Patented June 6, 1950

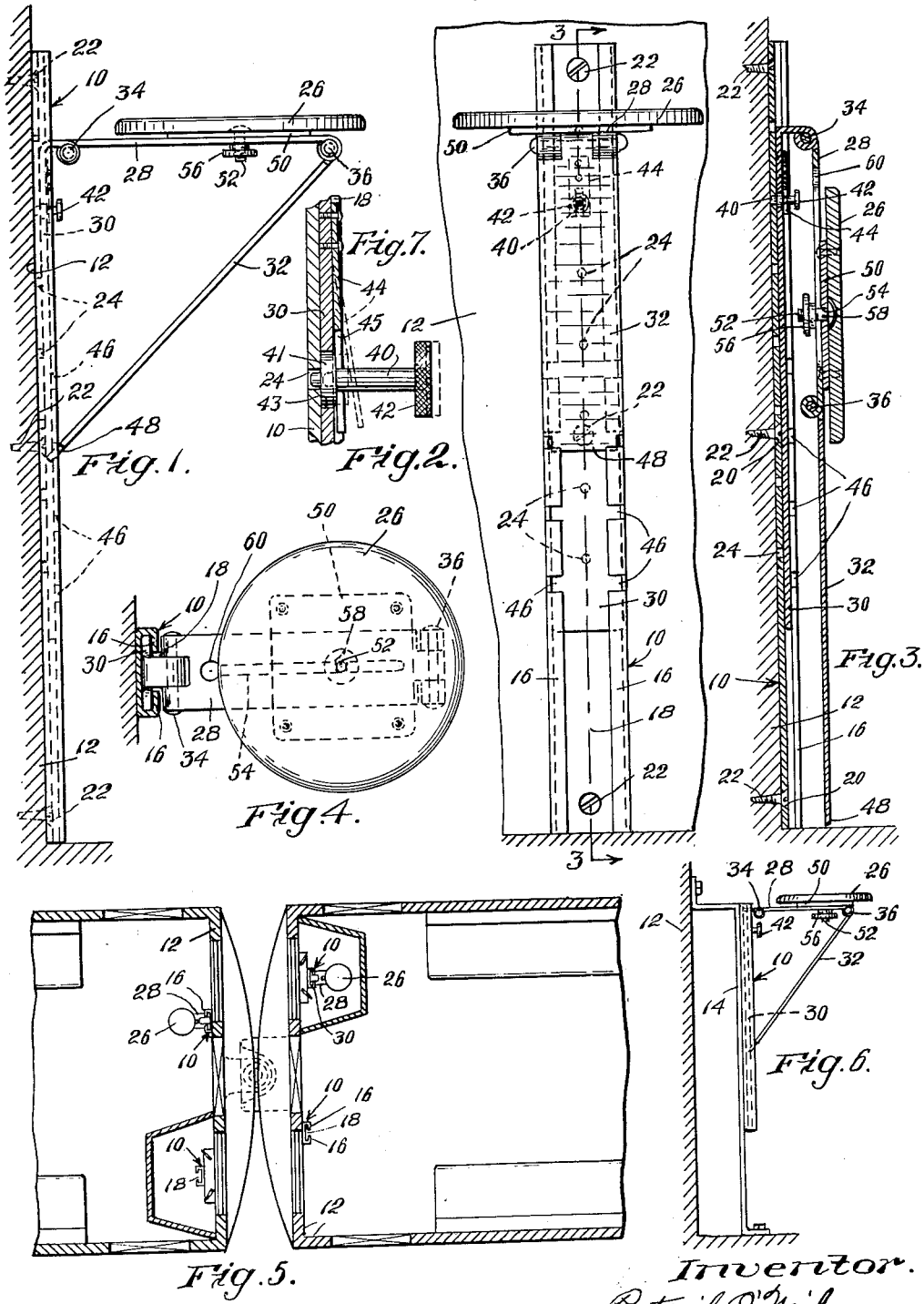

2,510,900

UNITED STATES PATENT OFFICE 2,510,900

WALL MOUNTED COLLAPSIBLE SEAT

Patrick O'Neil, Dorchester, Mass.

Application July 28, 1945, Serial No. 607,623

5 Claims. (Cl. 155—80)

This invention relates to improvements in collapsible seats. More particularly it relates to seats of the general type adapted for periodic use in passageways and the like and which may be collapsed or removed to clear a passageway so that persons or things may move freely in and out without the seat or its support constituting an obstruction.

The invention will be found useful wherever space limitations make it desirable to provide a seat for periodic use at a location which must be cleared of obstructions when the limited space is required for other purposes. For example, my improved seat has a particular utility on subway and elevated trains for accommodating a member of the train crew such as the guard who controls the opening and closing of car doors, or the motorman. Ordinarily the guard, between stations, is permitted to sit in a particular regular passenger seat at his end of the car if that seat is not occupied or wanted by a passenger, but usually this seat is occupied by a passenger and frequently will be found so occupied even though there may be vacant seats further inward in the car. Consequently, the guard must stand much of the time when he might be sitting if a seat were available for him. The motorman, on the other hand, customarily is enclosed in a restricted compartment wherein a seat is provided.

It has been proposed heretofore to provide a suspension seat for the guard, located generally outside a car between two inter-connected cars, but such seats are unsatisfactory in that ordinarily they provide no support for the back and they are entirely useless during inclement weather.

It is among the objects of my present invention to provide a collapsible seat which may be quickly mounted, adjusted and dis-mounted relative to a supporting wall and which quickly and effectively may be actuated between an operative position in which it may constitute a serviceable seat with the supporting wall as a back rest, and a collapsed position in which it has inconsequential projection outward from the plane of the supporting wall. In the case of a railway car, the seat may be removably mounted on an end wall of the car so that it projects into the passageway leading to and from the car when the seat is in operative position but it quickly may be collapsed to effectively clear the passageway as each station is approached. Also the seat may be positioned so that its use by the guard will not interfere with the comfort and ease of passengers.

Another object is to provide a collapsible seat which is readily transferable from one end to the other of a car depending upon which end is to be the leading end, and which may serve effectively as the seat within the motorman's compartment whenever a particular car is the leading car of a train.

Still another object is to provide a collapsible and removable seat which may be adjusted to selected heights and which will be rigid in each adjusted position.

Yet another object is to provide a seat supporting structure comprising hinged sections of rigid strap metal and socket means for reception of a said section, with provision for interengaging support by another said section as a strut.

It is, moreover, my purpose and object generally to improve upon prior collapsible and removable seat structures.

In the accompanying drawing:

Figure 1 is a side elevation of a seat embodying features of the invention and shown mounted in operative position on a vertical supporting wall;

Figure 2 is an elevational view looking from the right at the seat as shown in Figure 1;

Figure 3 is a cross-sectional view on line 3—3 of Figure 2 but with the seat in its collapsed position;

Figure 4 is a top plan view of the seat as shown in Figure 1;

Figure 5 is a diagrammatic plan view of the adjacent ends of two inter-connected cars of a train, showing my improved seat mounted for use by the guard in one car, and a similar seat mounted in the motorman's compartment of the other car;

Figure 6 is a side elevation of my improved seat mounted on a special bracket which may be provided in each motorman's compartment; and Figure 7 is a cross-sectional view showing the latching mechanism on a larger scale.

Referring to the drawing, a socket element is indicated generally at 10, adapted to be secured to any suitable support as the wall 12 in Figs. 1–5, or the bracket 14 in Fig. 6, which bracket may be secured to a vertical wall or to a wall and a floor as represented.

The socket element 10 preferably is formed of rugged sheet metal stock which can be formed into the general shape shown and which can withstand substantial forces and stresses which may tend to distort it. As shown, the socket element comprises a strip of substantial length whose side margins are turned inward into slightly spaced parallelism with the main body of the strip as at 16, the adjacent edges of the turned in portions being spaced apart to define a longitudinal slot 18 extending from end to end of the socket element. The main body of the element is provided with holes 20 therethrough for securement of the element to a support as by the screws 22. Also, the main body has spaced holes 24 therethrough for a purpose which later will appear.

The seat 26 is mounted on the mid-section 28 of a sectional frame whose other sections 30, 32 are hingedly connected respectively at 34 and 36 to the opposite ends of the mid-section. All of the sections 28, 30 and 32 may be of rugged and stiff strap metal stock, and the section 30 is adapted to fit slidably and endwise into the socket provided between the main body and the inturned portions of the socket element 10. A spring pressed pin 40 has an enlargement 41 thereon (Fig. 7) spaced a little from its inner end and loosely fitting within a hole 43 in the adjustable section 30. A flat spring 44 is secured at one end to section 30 and its other end portion is notched at 45 for engaging around the pin, with the spring engaging the enlargement 41 and constantly biasing the pin inward so that the inner end of the pin will snap into a hole 24 of socket element 10 whenever a hole 24 comes opposite the pin. The forwardly projecting headed portion of the pin extends freely through the longitudinal slot 18 with the head 42 in a forward position where it conveniently may be grasped by one's fingers. Hence, by withdrawing the pin 40 against the resilience of spring 44, the section 30 may be adjusted longitudinally of the socket element and may be locked in selected positions with pin 40 engaged in any one of the holes 24.

As best seen in Fig. 2, the inturned portions 16 of the socket element 10 are notched as at 46 at locations spaced vertically along the element and the strap section 32 has its free end formed with the reduced tongue 48 for engaging in any oppositely disposed pair of the notches 46. The location of the holes 24 and the notches 46 in the socket element 10 will have a predetermined relationship to each other and to the lengths of the upper part of strap section 30 and of strap section 32 so that, when pin 40 is engaged in a hole 24, the tongue 48 of section 32 may be engaged in a particular pair of the notches 46 to support the mid-section 28 in a generally horizontal plane, with the section 32 constituting an oblique strut capable of effectively sustaining the full weight of a person on the mid-section 28.

The seat 26 may be mounted on the mid-section 28 in any desired or suitable manner. However, a preferred mounting provides for adjustment of the seat on the mid-section 28 by means of the construction as illustrated wherein the seat 26 is secured to a plate 50 and the plate has a threaded stud 52 rigidly depending therefrom and extending through a slot 54 in the mid-section 28, with a clamping nut 56 on the stud beneath the section 28 for securing the plate and seat in adjusted positions. Preferably, the stud has a reduced flat portion 58 immediately below plate 50, and the slot 54 has width only sufficient to receive this flat portion of the stud. However, the end of slot 54 which is toward the section 30 has the circular enlargement 60 capable of loosely receiving the maximum diameter of the stud, whereby the seat may be assembled or removed only when the stud is at the enlarged end of the slot, and may be shifted along the slot with the flat portion 58 of the stud sliding in the slot and maintaining the seat and midsection 28 against relative rotation. The seat may be secured in any selected position along the mid-section 28 by tightening the clamping nut 56.

It is an important feature of the invention that my improved seat is adapted to be collapsed to an out-of-the-way position close up against its support during times of non-use, and to be quickly brought to operative position, and just as quickly collapsed again to clear a passageway or the like. The seat proper 26 may be preliminarily adjusted along the mid-section 28 to suit the particular user's fancy as to whether he prefers the seat close to the supporting wall which is to serve as a back rest, or out away from that wall more or less. Also the strap section 30 may be adjusted preliminarily to a desired vertical setting and locked there by the pin 40 engaging in a selected one of the holes 24. Subsequent manipulations may be confined to movements of the frame sections 28, 32 and the seat 26 between operative and collapsed positions, gravity acting to collapse the frame as a result of a slight lifting thereof sufficient to disengage tongue 48 from a particular pair of engaged notches 46.

When the seat is to be used in subway or elevated trains, it may be quickly shifted from one end of a car to the other as may be desired provided only that a socket element 10 be mounted permanently at each end of a car. Also, it is a feature that a single collapsible seat in a car may serve for a guard whenever the car is not the leading car of a train and may serve for the motorman when it happens to be the leading car because ordinarily there is no need for a guard on the leading car. Hence the seat, whenever not in use by a guard, conveniently may be placed in the motorman's compartment where it will be out of the way, and available for use by the motorman, if wanted.

However, a use of the seat by a motorman will be the reverse of its use by a guard in that the motorman must sit facing forward while a guard sits with his back against the forward wall of the car. Hence the socket element 10 which may be permanently mounted in the motorman's compartment preferably is secured to or formed integral with the rigid bracket 14 which in turn is secured to the forward wall and the floor of the compartment as indicated in Fig. 6, thereby to suitably space the seat 26 away from the forward wall.

It will be obvious from the foregoing description that I have provided an extremely serviceable seat which is inexpensive to manufacture and which can serve admirably the needs of train crews and the like without projecting appreciably into a passageway when collapsed, and which quickly and easily may be adjusted to suit particular requirements, and be shifted from one to another region of use, with only relatively thin socket elements required to be permanently mounted at any exposed region of use. Furthermore, my improved seat structure is secure against falling when mounted on its support and may be moved between operative and collapsed idling positions without danger of injury to the user or others who may be in the vicinity.

I claim as my invention:

1. A collapsible seat comprising a stiff relatively thin member, means for removably receiving and retaining said member in close vertical parallelism with a supporting wall, said means slidably engaging retaining said member at vertically spaced locations and said member being free to be withdrawn from said receiving means in one direction along the extent of the member, a seat member pivoted to an upper portion of said relatively thin member, and a stiff strut member pivoted to the seat member at a location spaced from the pivot of the seat member to the relatively thin member, and said receiving means and strut having means for removably supporting the free end of said strut member with the strut member oblique to the relatively thin member and with said seat member disposed generally in a horizontal plane.

2. A collapsible seat comprising three stiff elements hinged together in end to end relation, a seat mounted on the middle one of said elements, a socket member adapted to be mounted on a vertical support and in which an end one of said stiff elements is insertible and removable to and from a position in close parallelism with the support, said socket member having means thereon for removably supporting the free end of the other end one of said stiff elements with said middle stiff element approximately in a horizontal plane and with said other end one of the stiff elements constituting an oblique supporting strut for the middle stiff element, said middle stiff element being swingable to an inoperative position generally parallel with said support when the free end of said strut element is disengaged from its said supporting means.

3. A collapsible seat comprising a socket member adapted to be secured permanently in parallelism with a vertical wall, three hinged-together elements of which each end-most element has a free end, one said end most element having its said free end removably slidably inserted in said socket member, and the other said end-most element having its said free end reduced and disengageably supported down from the top on said socket member, there being a notch in said member in which the latter said free end is engaged and retained, a seat mounted on the third one of said elements and supported generally in a horizontal plane by said second one of the elements disposed obliquely thereunder as a strut.

4. A collapsible seat comprising three stiff strips of rugged strap metal hinged together in end to end relation, a seat mounted on the middle one of said strips and adjustable therealong, a socket member adapted to be mounted permanently in parallelism with a vertical wall and having provision for slidably receiving and retaining one of the endmost strips, means for holding said retained strip within the socket member, and means on the socket member for removably supporting the reduced free end of the other endmost strip with said strip disposed obliquely to the middle strip and constituting a strut for maintaining the middle strip and seat generally in a horizontal plane.

5. A collapsible seat comprising a supporting member permanently mounted on a vertical support and having means thereon providing a vertically disposed socket open at its upper end, a rigid member slidably and removably mounted in said socket, a pair of rigid elements of which one constitutes a seat-carrying element and the other constitutes a strut element, a seat secured on the seat-carrying element, one end of the seat-carrying element being pivotally connected to said rigid member in said socket and its other end being hingedly connected to one end of said strut element, and means low down on a wall of said socket for disengageably supporting the other end of said strut element with the latter said element constituting an oblique strut supporting the seat-carrying element in a generally horizontal plane.

PATRICK O'NEIL.

REFERENCES CITED

The following references are of record in the file of this patent:

UNITED STATES PATENTS

| Number | Name | Date |
|---|---|---|
| 328,181 | Briggs | Oct. 13, 1885 |
| 615,660 | Brockett | Dec. 6, 1898 |
| 661,861 | Gambrel | Nov. 13, 1900 |
| 667,492 | Brockett | Feb. 5, 1901 |
| 1,135,181 | Hastreiter | Apr. 13, 1915 |
| 1,207,074 | Pike | Dec. 5, 1916 |
| 1,232,874 | Whealen | July 10, 1917 |
| 1,236,960 | McMillan | Aug. 14, 1917 |
| 1,692,685 | Newman | Nov. 20, 1928 |
| 1,728,573 | Powers | Sept. 17, 1929 |